United States Patent
Yu et al.

(10) Patent No.: US 10,324,617 B2
(45) Date of Patent: Jun. 18, 2019

(54) OPERATION CONTROL METHOD AND TERMINAL

(71) Applicant: YULONG COMPUTER TELECOMMUNICATION SCIENTIFIC (SHENZHEN) CO., LTD., Shenzhen, Guangdong (CN)

(72) Inventors: Huijuan Yu, Guangdong (CN); Xueying Jing, Guangdong (CN)

(73) Assignee: YULONG COMPUTER TELECOMMUNICATION SCIENTIFIC (SHENZHEN) CO., LTD., Shenzhen, Guangdong (CN)

( * ) Notice: Subject to any disclaimer, the term of this patent is extended or adjusted under 35 U.S.C. 154(b) by 361 days.

(21) Appl. No.: 15/108,775

(22) PCT Filed: Dec. 31, 2013

(86) PCT No.: PCT/CN2013/091072
§ 371 (c)(1),
(2) Date: Jun. 28, 2016

(87) PCT Pub. No.: WO2015/100601
PCT Pub. Date: Jul. 9, 2015

(65) Prior Publication Data
US 2016/0334985 A1  Nov. 17, 2016

(51) Int. Cl.
*G06F 3/048* (2013.01)
*G06F 3/0488* (2013.01)
(Continued)

(52) U.S. Cl.
CPC ........ *G06F 3/04883* (2013.01); *G06F 3/0418* (2013.01); *G06F 3/04817* (2013.01);
(Continued)

(58) Field of Classification Search
None
See application file for complete search history.

(56) References Cited

U.S. PATENT DOCUMENTS 7,623,119 B2 * 11/2009 Autio ................ G06F 3/04883
345/173
2010/0088654 A1 * 4/2010 Henhoeffer ......... G06F 3/04883
715/863
(Continued)

FOREIGN PATENT DOCUMENTS

CN  102799376 A  11/2012
CN  102855062 A  1/2013
(Continued)

OTHER PUBLICATIONS

International Search Report for PCT/CN2013/091072, dated Sep. 28, 2014, ISA/CN.
(Continued)

*Primary Examiner* — Claudia Dragoescu
(74) *Attorney, Agent, or Firm* — Yue(Robert) Xu; Apex Attorneys at Law, LLP

(57) ABSTRACT

Provided are an operation control method and a terminal. The operation control method includes: identifying an operation trace activated on a terminal screen by a user; judging whether the operation trace is in an area where a grid path is located, the grid path being composed of gap regions among various application icons on a terminal interface; and if the operation trace is in the area where the grid path is located, then executing a shortcut operation corresponding to the operation trace. The method makes full use of gaps among application icons, and performs certain shortcut operations according to operation traces in the gaps so as to be effectively differentiated from other existing shortcut operation gesture areas to facilitate a user to operate.

18 Claims, 5 Drawing Sheets

(51) Int. Cl.
*G06F 3/0481* (2013.01)
*G06F 3/041* (2006.01)
*G06F 3/0484* (2013.01)

(52) U.S. Cl.
CPC ...... *G06F 3/04847* (2013.01); *G06F 3/04886* (2013.01); *G06F 2203/04803* (2013.01)

(56) References Cited

U.S. PATENT DOCUMENTS

| | | | |
|---|---|---|---|
| 2010/0229129 A1* | 9/2010 | Price | G06F 3/04883 715/863 |
| 2010/0257447 A1* | 10/2010 | Kim | G06F 3/04883 715/702 |
| 2010/0311470 A1* | 12/2010 | Seo | G06F 3/04883 455/566 |
| 2012/0176382 A1 | 7/2012 | Noh | |
| 2012/0213493 A1 | 8/2012 | Luo | |
| 2012/0324384 A1* | 12/2012 | Cohen | G06F 3/04886 715/765 |
| 2014/0033140 A1 | 1/2014 | Zeng | |
| 2014/0298253 A1* | 10/2014 | Jin | G06F 3/04842 715/790 |
| 2014/0351748 A1 | 11/2014 | Xia et al. | |
| 2015/0215444 A1 | 7/2015 | Tang et al. | |

FOREIGN PATENT DOCUMENTS

| | | |
|---|---|---|
| CN | 102968262 A | 3/2013 |
| CN | 103019592 A | 4/2013 |
| CN | 103324435 A | 9/2013 |
| EP | 2752748 A1 | 7/2014 |

OTHER PUBLICATIONS

European Search Report for 13900632.4-1879/3091815, dated Jul. 17, 2017.

* cited by examiner

OPERATION CONTROL METHOD AND TERMINAL

The application is a National Stage application of PCT international application No. PCT/CN2013/091072, titled "OPERATION CONTROL METHOD AND TERMINAL", filed on Dec. 31, 2013, which is incorporated herein by reference in its entirety.

FIELD

The present application relates to the field of communication technology, and in particular to an operation control method and a terminal.

BACKGROUND

A terminal screen becomes bigger and bigger, the number of application icons displayable on each menu page thereof gets larger, and a gap among the application icons also increases. The gap among the application icons may form a set of grid path, and the set of grid path is not used to realize specific shortcut operations in related conventional technology.

SUMMARY

A new operation control technique is provided in the disclosure with respect to above technical problem, which can fully use a grid path formed by a gap among the application icons to realize specific shortcut operations.

In view of this, an operation control method is provided in one aspect of the disclosure. The method includes: identifying an operation trace applied on a terminal screen by a user; determining whether the operation trace is in a region where a grid path is located, wherein a gap region among application icons on a terminal interface forms the grid path; and executing a shortcut operation corresponding to the operation trace if the operation trace is in the region where the grid path is located.

Since the terminal screen becomes bigger, the gap among the application icons also increases and a region except regions where the application icons are located forms a set of grid path region. The operation trace applied on the terminal screen by the user is detected, and if the operation trace is in the grid path region, a preset shortcut operation is performed. Operation traces corresponding to shortcut operations may be set before the terminal leaves a factory, or operation traces corresponding to shortcut operations may be set by the user based on habits of the user. The gap among the application icons is fully used in the implementations mentioned above, the shortcut operations are realized based on the gap, and a larger amount of convenient operations are provided for the user.

In the technical solution mentioned above, the determining whether the operation trace is in the region where the grid path is located includes: obtaining a coordinate range of the region where the grid path is located based on coordinate data of the application icons on the terminal interface; and obtaining coordinate data of the operation trace, and determining whether coordinates of the operation trace are in the coordinate range of the region where the grid path is located based on the coordinate data of the operation trace.

There are multiple ways to determine whether the operation trace is in the region where the grid path is located, and a preferable way is to determine whether coordinates of the operation trace are in the coordinate range of the grid path region. Herein, a start point, an end point and an inflection point(s), rather than all points of the operation trace, can be collected to generally determine a direction and coordinates of the operation trace based on these points, thus decreasing a quantity of calculation and improving speed of the calculation.

In any of the technical solutions mentioned above, the operation control method may further include: determining an initial direction of the operation trace for the terminal to enter a shortcut operation mode if the initial direction is consistent with a preset direction.

To distinguish from other gestures and avoid a misoperation, in the technical solution, it is required to determine whether the initial direction of a user operation trace is consistent with the preset direction, and in case of positive determination, it concludes that the operation trace is an effective operation trace which triggers the terminal to enter the shortcut operation mode provided in the disclosure. The shortcut operation mode is a new terminal mode corresponding to implementation of the shortcut operation based on the gap among the application icons provided in the disclosure, which is referred to as the shortcut operation mode.

In any of the technical solutions mentioned above, preferably, the operation control method may further include: reducing an effective response area of each application icon, to expand a gap region which may respond to the operation trace.

In conventional technology, in order to intelligently respond to a user trigger, the effective response area of the application icon is actually larger than an icon area seen by the user, which may cause false triggering of the effective response region of the application icons in the case that an operation is performed in the gap among the application icons, and result in the misoperation. In order to solve the problem, a solution is provided in the embodiments, wherein, if the operation trace of the user is an effective operation trace triggering a shortcut operation mode provided in the disclosure, or if it is detected that the user performs an operation in the gap region, an area of the application icon in effective response to a user operation is reduced. Thus an area of the region where the grid path is actually located may be expanded, and the false triggering may be decreased.

In any of the technical solutions mentioned above, preferably, an identifier of the grid path is displayed on the terminal interface in the case that it is determined that the terminal may enter the shortcut operation mode; and the identifier of the grid path is hidden in the case that the operation trace ends.

In the case that the initial direction of the operation trace is consistent with the preset direction, it is considered that the user may be to perform the shortcut operation, thus the terminal enters the shortcut operation mode provided in the disclosure. For the convenience of the user operation, the grid path is displayed on the terminal interface, so that the user may touch the screen based on the displayed grid path, and the grid path is hidden in the case that the operation ends in order to avoid an influence on normal display of the application icon.

In any of the technical solutions mentioned above, preferably, the operation trace includes a continuous touch trace across the terminal interfaces. The user may perform a touch operation on a current terminal interface, or across pages, for example, the user performs the touch operation with one hand, and turns the pages with the other hand, touching from a current page to next multiple pages, herein, the operation trace is continuous though the touching operation is across pages.

In any of the technical solutions mentioned above, preferably, the shortcut operation includes at least one of: entering a private mode of the terminal, hiding a part of the application icons on the terminal interface, starting a designated application, and entering a designated scenario of the terminal.

In another aspect of the disclosure, a terminal is provided. The terminal includes: an identifying unit, configured to identify an operation trace applied on a terminal screen by a user; a first determining unit, configured to determine whether the operation trace is within a region where a grid path is located, where a gap region among application icons on a terminal interface forms the grid path; and an executing unit, connected to the first determining unit, and configured to execute a shortcut operation corresponding to the operation trace in the case that the operation trace is within the region where the grid path is located.

Since the terminal screen becomes bigger, the gap among the application icons also increases and a region except regions where the application icons are located forms a set of grid path region. The operation trace applied on the terminal screen by the user is detected, and if the operation trace is in the grid path region, a preset shortcut operation is performed. Operation traces corresponding to shortcut operations may be set before the terminal leaves a factory, or operation traces corresponding to shortcut operations may be set by the user based on habits of the user. The gap among the application icons is fully used in the implementations mentioned above, the shortcut operations are realized based on the gap, and a larger amount of convenient operations are provided for the user.

In any of the technical solutions mentioned above, preferably, the first determining unit includes a coordinate obtaining unit, configured to obtain a coordinate range of the region where the grid path is located based on coordinate data of the application icons on the terminal interface, obtain coordinate data of the operation trace, and determine whether coordinates of the operation trace are in the coordinate range of the region where the grid path is located based on the coordinate data of the operation trace.

There are multiple ways to determine whether the operation trace is in the region where the grid path is located, and a preferable way is to determine whether coordinates of the operation trace are in the coordinate range of the grid path region. A start point, an end point and an inflection point(s), rather than all points of the operation trace, can be collected to generally determine a direction and coordinates of the operation trace based on these points, thereby decreasing a quantity of calculation and improving speed of the calculation.

In any of the technical solutions mentioned above, preferably, the terminal may further include a second determining unit configured to determine an initial direction of the operation trace for the terminal to enter a shortcut operation mode if the initial direction is consistent with a preset direction.

To distinguish from other gestures and avoid a misoperation, in the technical solution, it is required to determine whether the initial direction of a user operation trace is consistent with the preset direction, and in case of positive determination, it concludes that the operation trace is an effective operation trace which triggers the terminal to enter the shortcut operation mode provided in the disclosure. The shortcut operation mode is a new terminal mode corresponding to implementation of the shortcut operation based on the gap among the application icons provided in the disclosure, which is referred to as the shortcut operation mode.

In any of the technical solutions mentioned above, preferably, the terminal may further include a grid path region adjusting unit, configured to reduce an effective response area of each application icon, to expand a gap region which may respond to the operation trace.

In conventional technology, in order to intelligently respond to a user trigger, the effective response area of the application icon is actually larger than an icon area seen by the user, which may cause false triggering of the effective response region of the application icons in the case that an operation is performed in the gap among the application icons, and result in the misoperation. In order to solve the technical problem, a solution is provided in the embodiments, wherein, if the operation trace of the user is an effective operation trace triggering the terminal to enter a shortcut operation mode provided in the disclosure, or if it is detected that the user performs an operation in the gap region, an area of the application icon in effective response to a user operation is reduced. Thus an area of the region where the grid path is actually located may be expanded, and the false triggering may be decreased.

In any of the technical solutions mentioned above, preferably, the terminal may further include a display controlling unit, configured to display an identifier of the grid path on the terminal interface in the case that the second determining unit determines that the terminal may enter the shortcut operation mode, and hide the identifier of the grid path in the case that the operation trace ends.

In the case that the initial direction of the operation trace is consistent with the preset direction, it is considered that the user may be to perform the shortcut operation, thus the terminal enters the shortcut operation mode provided in the disclosure. For the convenience of the user operation, the grid path is displayed on the terminal interface, so that the user may touch the screen based on the displayed grid path, and the grid path is hidden in the case that the operation ends in order to avoid an influence on normal display of the application icon.

In any of the technical solutions mentioned above, preferably, the operation trace includes a continuous touch trace across the terminal interfaces.

In any of the technical solutions mentioned above, preferably, the shortcut operation includes at least one of: entering a private mode of the terminal, hiding a part of the application icons on the terminal interface, starting a designated application, and entering a designated scenario of the terminal. The user may perform a touch operation on a current terminal interface, or across pages, for example, the user performs the touch operation with one hand, and turns the pages with the other hand, touching from a current page to next multiple pages, herein, the operation trace is continuous though the touching operation is across pages.

In still another aspect of the disclosure, a program product stored in a non-volatile machine-readable medium is further provided. The program product is used for operation control. The program product includes a machine-executable instruction which allows the computer system to execute the following steps: identifying an operation trace applied on a terminal screen by a user, and determining whether the operation trace is in a region where a grid path is located, where a gap region among application icons on a terminal interface forms the grid path; and executing a shortcut operation corresponding to the operation trace if the operation trace is in the region where the grid path is located.

In yet another aspect of the disclosure, a non-volatile machine-readable medium is further provided. The non-volatile machine-readable medium is used to store a program product.

The program product includes a machine-executable instruction which allows the computer system to execute the following steps: identifying an operation trace applied on a terminal screen by a user, and determining whether the operation trace is in a region where a grid path is located, where a gap region among application icons on a terminal interface forms the grid path; and executing a shortcut operation corresponding to the operation trace if the operation trace is in the region where the grid path is located.

In still another aspect of the disclosure, a machine-readable program is further provided. The program allows a machine to execute any of the operation control methods in the technical solutions mentioned above.

In yet another aspect of the disclosure, a storage medium which stores a machine-readable program is further provided. The computer-readable program allows a machine to execute any of the operation control methods in the technical solutions mentioned above.

DETAILED DESCRIPTION

To make the objects, features and merits of the disclosure clearer, the disclosure is described in detail in conjunction with drawings and implementations thereof. It should be noted that, embodiments and features in the embodiments may combine with each other without conflict.

Many specific details are illustrated in the following description to sufficiently understand the disclosure, and in practice, other ways different from the description herein can be adopted to implement the disclosure. Thus, the scope of protection of the disclosure is not limited to the following disclosed embodiments.

Figure 1:
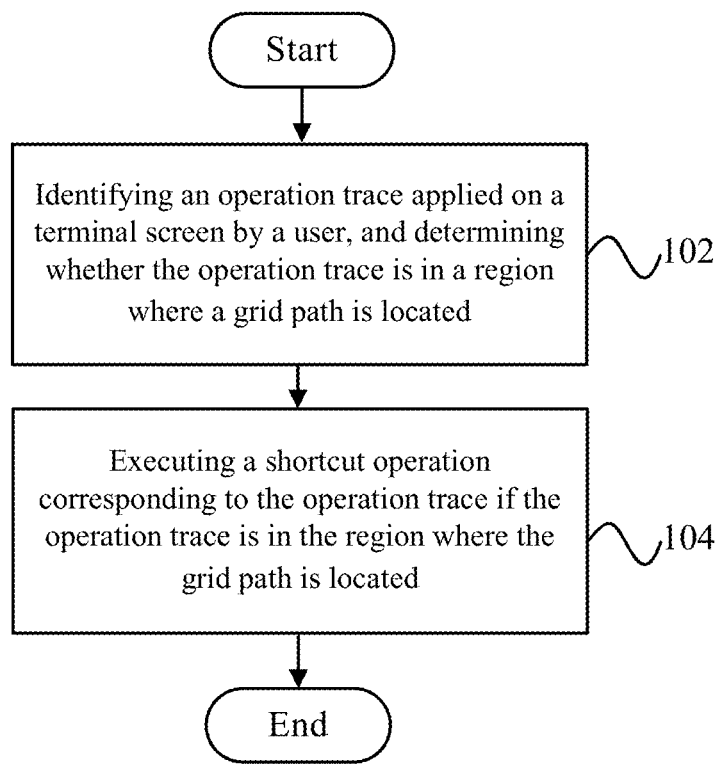
FIG. 1 is a flowchart of an operation control method according to an embodiment of the disclosure.

FIG. 1 is a flowchart of an operation control method according to an embodiment of the disclosure.

As shown in FIG. 1, the operation control method according to the embodiment of the disclosure may include steps 102 and 104. In step 102, an operation trace applied on a terminal screen by a user is identified, and it is determined whether the operation trace is in a region where a grid path is located, where the grid path is formed by a gap region among application icons on a terminal interface. In step 104, a shortcut operation corresponding to the operation trace is executed if the operation trace is in the region where the grid path is located.

Since the terminal screen becomes bigger, the gap among the application icons also increases and a region except regions where the application icons are located forms a set of grid path region. The operation trace applied on the terminal screen by the user is detected, and if the operation trace is in the grid path region, a preset shortcut operation is performed. Operation traces corresponding to shortcut operations may be set before the terminal leaves a factory, or operation traces corresponding to shortcut operations may be set by the user based on habits of the user. The gap among the application icons is fully used in the implementations mentioned above, the shortcut operations are realized based on the gap, and a larger amount of convenient operations are provided for the user.

In the technical solution mentioned above, preferably, determining whether the operation trace is in the region where the grid path is located includes: obtaining a coordinate range of the region where the grid path is located based on coordinate data of the application icons on the terminal interface; and obtaining coordinate data of the operation trace, and determining whether coordinates of the operation trace are in the coordinate range of the region where the grid path is located based on the coordinate data of the operation trace.

There are multiple ways to determine whether the operation trace is in the region where the grid path is located, and a preferable way is to determine whether coordinates of the operation trace are in the coordinate range of the grid path region, wherein, a start point, an end point and an inflection point(s), rather than all points of the operation trace, can be collected, to generally determine a direction and coordinates of the operation trace based on these points, thus decreasing the amount of calculation and improving speed of the calculation.

In any of the technical solutions mentioned above, preferably, the method may further include: determining an initial direction of the operation trace, and if the initial direction is consistent with a preset direction, triggering the terminal to enter a shortcut operation mode.

To distinguish from other gestures and avoid a misoperation, in the technical solution, it is required to determine whether the initial direction of a user operation trace is consistent with the preset direction, and in case of positive determination, it concludes that the operation trace is an effective operation trace which triggers the terminal to enter the shortcut operation mode provided in the disclosure. The shortcut operation mode is a new terminal mode corresponding to implementation of the shortcut operation based on the gap among the application icons provided in the disclosure, which is referred to as the shortcut operation mode.

In any of the technical solutions mentioned above, preferably, the method may further include: reducing an effective response area of each application icon, to expand a gap region which may respond to the operation trace.

In conventional technology, in order to intelligently respond to a user trigger, the effective response area of the application icon is actually larger than an icon area seen by the user, which may cause false triggering of the effective response area of the application icon in the case that an operation is performed in the gap among the application icons, and result in the misoperation. In order to solve above technical problem, a solution is provided in the embodiments, wherein, if the operation trace of the user is an effective operation trace for triggering a shortcut operation mode provided in the disclosure, or if it is detected that the user performs an operation in the gap region, an area of the application icon in effective response to a user operation is reduced. Thus an area of the region where the grid path is actually located may be expanded, and the false triggering may be decreased.

In any of the technical solutions mentioned above, preferably, an identifier of the grid path is displayed on the terminal interface in the case that it is determined that the terminal may enter the shortcut operation mode; and the identifier of the grid path is hidden in the case that the operation trace ends.

In the case that the initial direction of the operation trace is consistent with the preset direction, it is considered that the user may be to perform the shortcut operation, thus the terminal enters the shortcut operation mode provided in the disclosure. For the convenience of the user operation, the grid path is displayed on the terminal interface, so that the user may touch the screen based on the displayed grid path, and the grid path is hidden when the operation ends in order to avoid an influence on normal display of the application icon.

In any of the technical solutions mentioned above, preferably, the operation trace includes a continuous touch trace across the terminal interfaces. The user may perform a touch operation on a current terminal interface, or across pages, for example, the user performs the touch operation with one hand, and turns the pages with the other hand, touching from a current page to next multiple pages, herein, the operation trace is continuous though the touching operation is across pages.

In any of the technical solutions mentioned above, preferably, the shortcut operation includes at least one of: entering a private mode of the terminal, hiding a part of the application icons on the terminal interface, starting a designated application, and entering a designated scenario of the terminal.

Figure 2:
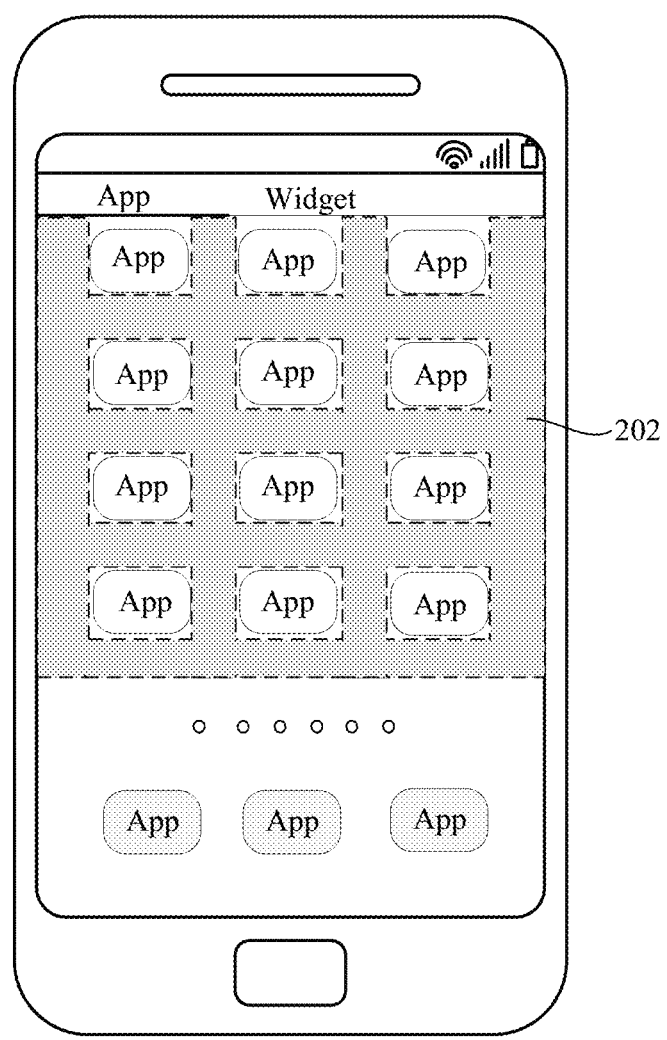
FIG. 2 is a schematic diagram of a grid path according to the embodiment of the disclosure.
Figure 3:
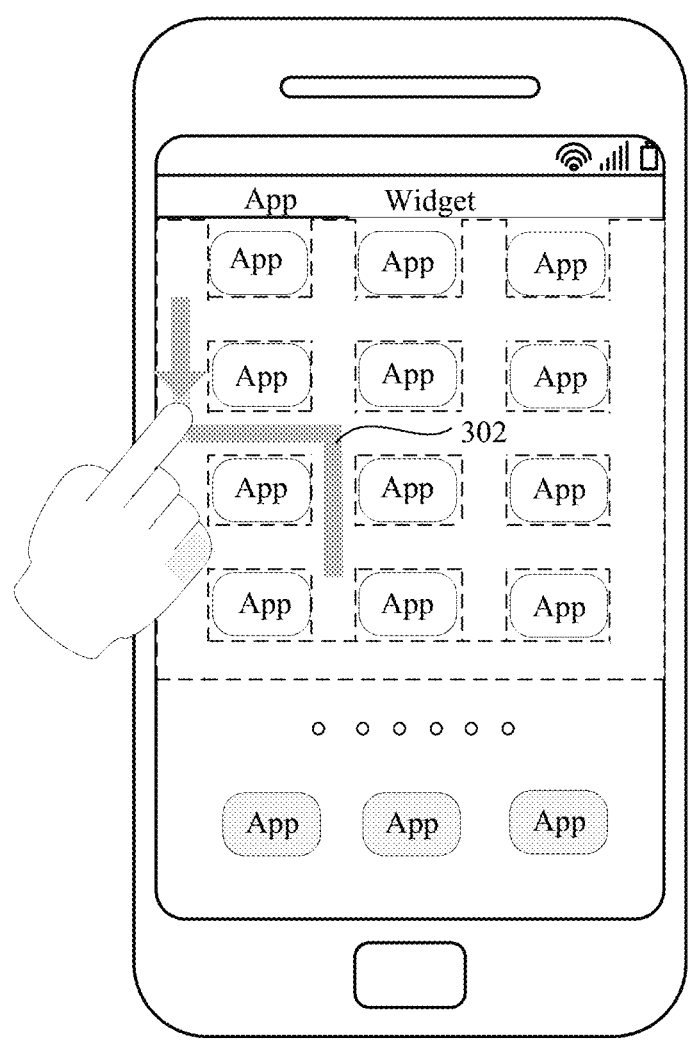
FIG. 3 is a schematic diagram of an operation trace according to the embodiment of the disclosure.
Figure 4:
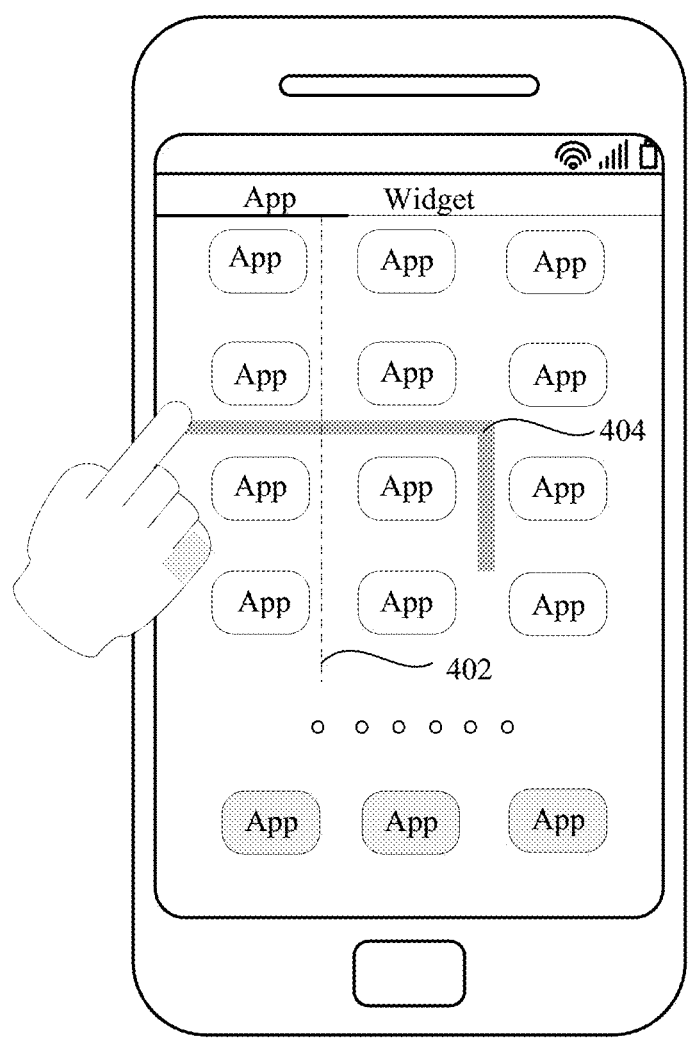
FIG. 4 is a schematic diagram of operating across pages according to the embodiment of the disclosure.

The operation control method of the disclosure is further illustrated in conjunction with FIG. 2 to FIG. 4.

A size of a terminal screen becomes bigger and bigger, and a gap among application icons is also larger than before. Functions of shortcut operations are implemented based on the gap among the application icons according to the embodiment. As shown in FIG. 2, the gap among the application icons forms another set of grid path 202.

A finger of a user may draw specific operation traces on the grid path 202 shown in FIG. 2. Operation traces (or referred to as gestures) corresponding to common functions may be preset before the terminal leaves a factory, for example, moving vertically downwards, then turning right and passing by two application icons, and moving vertically downwards again, which corresponds to entering a private mode of the terminal. When the user makes such an operation trace, the private mode of the terminal is entered, and a shortcut operation of entering the private mode is implemented.

As shown in FIG. 3, when the user completes an operation trace shown as 302 on the terminal screen, the terminal immediately starts an application, e.g., Bluetooth. It should be noted that, to distinguish from conventional gestures, a step of determining whether an operation trace of the user is effective is provided according to the embodiment. A horizontal sliding refers usually to turning pages by the user, and if the horizontal sliding is in an initial direction of the operation trace for the user to implement a shortcut operation, the terminal mistakes for an operation of turning pages. Actually, the user needs the terminal to enter the private mode. To avoid a misoperation, it is required to limit the initial direction of the operation trace to be different from a conventional gesture.

In a preferable implementation, the operation trace is effective in the case that the initial direction of the operation trace is set vertically downwards, and other initial directions are dismissed. When it is determined that the initial direction of the operation trace is vertically downward, a shortcut operation which the user needs to implement is further determined, i.e., an operation trace which the user has completed currently is matched to a preset operation trace, and a corresponding shortcut operation is performed based on a matching result, e.g., entering the private mode, starting an application, switching the scenario of the terminal, and changing the volume.

In addition, the user may operate on a current page, and may further turn pages. As shown in FIG. 4, supposing that the user's right hand slides on a first page and he turns pages with a left hand, and 402 is a paging line, an operation trace on the first page may extends to a second page, as shown by an operation trace 404, which extends from the first page to the second page.

At present, in order to intelligently respond to an operation performed on an application icon by the user, an effective response area of the application icon is expanded to be larger than an area where the application icon is located, so that even a finger of the user is not entirely on the application icon, the operation of the user may be responded to start the application. Thus the grid path according to the disclosure actually overlaps the effective response areas of the application icons, and the user may touch an effective response region of an application icon when operating on the grid path, and cause false triggering of the application icon to start the application. In order to solve the technical problem, a solution is provided according to the embodiment: it is determined whether a current operation trace of the user is intended to perform the shortcut operation through determining whether the initial direction of the operation trace is vertical; in case of positive determination, it concludes that the user intends to enter a shortcut operation mode, wherein, the effective response areas of application icons are reduced, so that an actual area of the grid path is extended, which is convenient for the finger of the user to operate on the grid path without false triggering.

Besides the forgoing processing modes, a fault tolerant technique may be introduced. A false triggering operation may be neglected (not responded to) if effective response areas of the application icons on two sides of the grid path are touched during operating on the grid path, and it is considered that the user needs to implement an operation trace on the grid path to realize the shortcut operation.

At the same time, for the convenience of the user operation on the grid path, an identifier of the grid path may be displayed on the terminal interface, and the identifier of the grid path may be hidden in the case that the operation trace ends.

In another implementation, a user double-clicks a terminal interface, the terminal determines a shortcut operation mode of the terminal which the user wants after receiving the operation signal, reduces the effective response areas of the application icons, displays the identifier of the grid path on the terminal interface, and enters the shortcut operation mode of the disclosure.

An operation trace of a user's finger on the terminal screen is detected, and it is determined whether the operation trace is within the grid path. In case of positive determination, it is further determined whether the initial direction of the operation trace is vertical, and in case of negative determination, the operation trace is not responded to. If the initial direction of the operation trace is vertical, the operation trace is matched to a preset operation trace, and a matched shortcut function is executed, e.g., hiding a part of the application icons.

Figure 5:
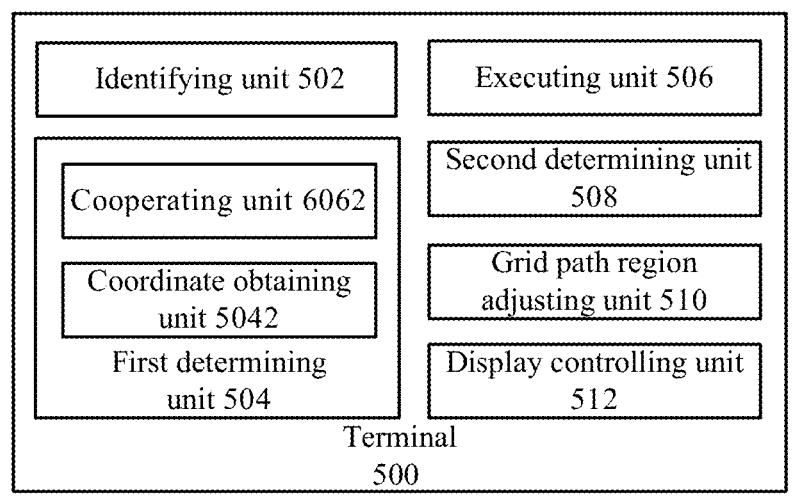
FIG. 5 is a block diagram of a terminal according to an embodiment of the disclosure.

FIG. 5 is a block diagram of a terminal according to an embodiment of the disclosure.

As shown in FIG. 5, a terminal 500 according to the embodiment of the disclosure may include: an identifying unit 502, configured to identify an operation trace applied on a terminal screen by a user; a first determining unit 504, configured to determine whether the operation trace is within a region where a grid path is located, where, a gap region among application icons on a terminal interface forms the grid path; and an executing unit 506, connected to the first determining unit 504 and configured to execute a shortcut operation corresponding to the operation trace in the case that the operation trace is in the region where the grid path is located.

Since the terminal screen becomes bigger, the gap among the application icons also increases and a region except regions where the application icons are located forms a set of grid path region. The operation trace applied on the terminal screen by the user is detected, and if the operation trace is in the grid path region, a preset shortcut operation is performed. Operation traces corresponding to shortcut operations may be set before the terminal leaves a factory, or operation traces corresponding to shortcut operations may be set by the user based on habits of the user. The gap among the application icons is fully used in the implementations mentioned above, the shortcut operations are realized based on the gap, and a larger amount of convenient operations are provided for the user.

In any of the technical solutions mentioned above, preferably, the first determining unit 504 includes a coordinate obtaining unit 5042, configured to obtain a coordinate range of the region where the grid path is located based on coordinate data of the application icons on the terminal interface, obtain coordinate data of the operation trace, and determine whether coordinates of the operation trace are in the coordinate range of the region where the grid path is located based on the coordinate data of the operation trace.

There are multiple ways to determine whether the operation trace is in the region where the grid path is located, and a preferable way is to determine whether coordinates of the operation trace are in the coordinate range of the grid path region. A start point, an end point and an inflection point(s), rather than all points of the operation trace, can be collected to generally determine a direction and coordinates of the operation trace based on these points, thus decreasing a quantity of calculation, and improving speed of the calculation.

In any of the technical solutions mentioned above, preferably, the terminal may further include a second determining unit 508, configured to determine an initial direction of the operation trace. If the initial direction is consistent with a preset direction, the terminal is triggered to enter a shortcut operation mode.

To distinguish from other gestures and avoid a misoperation, in the technical solution, it is required to determine whether the initial direction of a user operation trace is consistent with a preset direction, and in case of positive determination, it concludes that the operation trace is an effective operation trace which triggers the terminal to enter the shortcut operation mode provided in the disclosure. The shortcut operation mode is a new terminal mode corresponding to implementation of the shortcut operation based on the gap among the application icons provided in the disclosure, which is referred to as the shortcut operation mode.

In any of the technical solutions mentioned above, preferably, the terminal may further include a grid path region adjusting unit 510, configured to reduce an effective response area of each application icon, to expand a gap region which may respond to the operation trace.

In conventional technology, in order to intelligently respond to a user's triggering, the effective response area of the application icon is actually larger than an icon area seen by the user, which may cause false triggering of the effective response region of the application icons in the case that an operation is performed in the gap among application icons, and result in the misoperation. In order to solve the above problem, a solution is provided in the embodiments, wherein, if the operation trace of the user is an effective operation trace triggering a shortcut operation mode provided in the disclosure, or if it is detected that the user performs an operation in the gap region, areas of the application icons in effective response to a user operation are reduced. Thus an area of the region where the grid path is actually located may be expanded, thereby decreasing the false triggering.

In any of the technical solutions mentioned above, preferably, the terminal may include a display controlling unit 512, configured to display an identifier of the grid path on the terminal interface when the second determining unit 508 determines that the terminal may enter the shortcut operation mode, and hide the identifier of the grid path in the case that the operation trace ends.

In the case that the initial direction of the operation trace is consistent with the preset direction, it is considered that the user may be to perform the shortcut operation, thus the terminal enters the shortcut operation mode provided in the disclosure. For the convenience of the user operation, the grid path is displayed on the terminal interface, so that the user may touch the screen based on the displayed grid path, and the grid path is hidden when the operation ends in order to avoid an influence on normal display of the application icon.

In any of the technical solutions mentioned above, preferably, the operation trace includes a continuous touch trace across the terminal interfaces.

In any of the technical solutions mentioned above, preferably, the shortcut operation includes at least one of: entering a private mode of the terminal, hiding a part of the application icons on the terminal interface, starting a designated application, and entering a designated scenario of the terminal. The user may perform a touch operation on a current terminal interface, or across pages, for example, the user performs the touch operation with one hand, and turns the pages with the other hand, touching from a current page to next multiple pages, herein, the operation trace is continuous though the touching operation is across pages.

According to the embodiments of the disclosure, a program product stored in a non-volatile machine-readable medium is further provided. The program product is used for operation control, and includes machine-executable instructions which allow the computer system to execute the following steps: identifying an operation trace applied on a terminal screen by a user, and determining whether the operation trace is in a region where a grid path is located, where a gap region among application icons on a terminal interface forms the grid path; and executing a shortcut operation corresponding to the operation trace if the operation trace is in the region where the grid path is located.

According to the embodiments of the disclosure, a non-volatile machine-readable medium is further provided. The non-volatile machine-readable medium is configured to store a program product for operation control. The program product includes machine-executable instructions which allow the computer system to execute the following steps: identifying an operation trace applied on a terminal screen by a user, and determining whether the operation trace is in a region where a grid path is located, where a gap region among application icons on a terminal interface forms the grid path; and executing a shortcut operation corresponding to the operation trace if the operation trace is in the region where the grid path is located.

According to the embodiments of the disclosure, a machine-readable program is further provided. The program allows the computer to execute any of the operation control methods in the technical solutions mentioned above.

According to the embodiments of the disclosure, a storage medium which stores a machine-readable program is further provided. The machine-readable program allows the machine to execute any of the operation control methods in the technical solutions mentioned above.

The technical solutions of the disclosure are described in detail in conjunction with the drawings. A recessive trace gesture is designed based on a gap among application icons, thereby realizing a secure operation triggering without influencing a original layout of the interface, and enriching current gesture control modes.

Only preferable embodiments of the disclosure are described above, which are not to limit the scope of the disclosure. For those skilled in the art, various changes and modifications may be made to the disclosure. Any modification, substitution and improvement without departing from the spirit and principle of the disclosure fall within the protection scope of the application.

The invention claimed is:

1. An operation control method, comprising:
   identifying, by a terminal, an operation trace applied on a terminal screen of the terminal by a user;
   determining an initial direction of the operation trace;
   in response to the initial direction being consistent with a preset direction,
      entering, by the terminal, a shortcut operation mode;
      displaying an identifier of a grid path on a terminal interface, wherein a gap region among application icons on the terminal interface forms the grid path, and the identifier is configured to indicate the grid path for touch operation on the terminal screen; and
      hiding the identifier of the grid path in response to the operation trace ending;
   determining whether the operation trace is in a region where the grid path is located; and
   executing a shortcut operation corresponding to the operation trace in response to the operation trace being in the region where the grid path is located.

2. The operation control method according to claim 1, wherein the determining whether the operation trace is in the region where the grid path is located comprises:
   obtaining a coordinate range of the region where the grid path is located based on coordinate data of the application icons on the terminal interface; and
   obtaining coordinate data of the operation trace, and determining whether coordinates of the operation trace are in the coordinate range of the region where the grid path is located based on the coordinate data of the operation trace.

3. The operation control method according to claim 1, wherein the operation trace comprises a continuous touch trace across the terminal interfaces.

4. The operation control method according to claim 1, wherein in response to the initial direction being consistent with the preset direction, an effective response area of each application icon is reduced, to expand a gap region which may respond to the operation trace.

5. The operation control method according to claim 1, wherein the shortcut operation comprises at least one of:
   entering a private mode of the terminal, hiding a part of the application icons on the terminal interface, starting a designated application, and entering a designated scenario of the terminal.

6. A terminal, comprising:
   a processor; and
   a memory storing instructions,
   wherein the processor when the instructions are executed configures the terminal to:
   identify an operation trace applied on a terminal screen of the terminal by a user;
   determine an initial direction of the operation trace;
   in response to the initial direction being consistent with a preset direction,
      enter a shortcut operation mode;
      display an identifier of a grid path on a terminal interface, wherein a gap region among application icons on the terminal interface forms the grid path, and the identifier is configured to indicate the grid path for touch operation on the terminal screen; and
      hide the identifier of the grid path in response to the operation trace ending;
   determine whether the operation trace is within a region where a grid path is located, wherein a gap region among application icons on a terminal interface forms the grid path; and
   execute a shortcut operation corresponding to the operation trace in response to the operation trace being within the region where the grid path is located.

7. The terminal according to claim 6, wherein the processor further configures the terminal to:
   obtain a coordinate range of the region where the grid path is located based on coordinate data of the application icons on the terminal interface, obtain coordinate data of the operation trace, and determine whether coordinates of the operation trace are in the coordinate range of the region where the grid path is located based on the coordinate data of the operation trace.

8. The terminal according to claim 6, wherein the operation trace comprises a continuous touch trace across terminal interfaces.

9. The terminal according to claim 6, wherein the processor further configures the terminal to:
   reduce, in response to the initial direction being consistent with the preset direction, an effective response area of each application icon, to expand a gap region which may respond to the operation trace.

10. The terminal according to claim 6, wherein the shortcut operation comprises at least one of:
   entering a private mode of the terminal, hiding a part of the application icons on the terminal interface, starting a designated application, and entering a designated scenario of the terminal.

11. The terminal according to claim 7, wherein the processor further configures the terminal to:
   reduce, in response to the initial direction being consistent with the preset direction, an effective response area of each application icon, to expand a gap region which may respond to the operation trace.

12. The terminal according to claim 7, wherein the shortcut operation comprises at least one of:
   entering a private mode of the terminal, hiding a part of the application icons on the terminal interface, starting a designated application, and entering a designated scenario of the terminal.

13. The operation control method according to claim 2, wherein in response to the initial direction being consistent with the preset direction, an effective response area of each application icon is reduced, to expand a gap region which may respond to the operation trace.

14. The operation control method according to claim 2, wherein the shortcut operation comprises at least one of:
   entering a private mode of the terminal, hiding a part of the application icons on the terminal interface, starting a designated application, and entering a designated scenario of the terminal.

15. The operation control method according to claim 3, wherein in response to the initial direction being consistent with the preset direction, an effective response area of each application icon is reduced, to expand a gap region which may respond to the operation trace.

16. A non-transitory machine-readable medium configured to store a program product for operation control, wherein, the program product includes machine-executable instructions which allow the computer system to execute the following steps: identifying an operation trace applied on a terminal screen by a user; determining an initial direction of the operation trace; in response to the initial direction being consistent with a preset direction, entering a shortcut operation mode, displaying an identifier of a grid path on a terminal interface, and hiding the identifier of the grid path in response to the operation trace ending, wherein a gap region among application icons on the terminal interface forms the grid path, and the identifier is configured to indicate the grid path for touch operation on the terminal screen; and determining whether the operation trace is in a region where the grid path is located; and executing a shortcut operation corresponding to the operation trace in response to the operation trace being in the region where the grid path is located.

17. The operation control method according to claim 1, wherein in the shortcut operation mode, operation of touching effective response areas of the application icons is neglected.

18. The operation control method according to claim 2, wherein obtaining coordinate data of the operation trace comprises:
   obtaining coordinate data of the operation trace, based on a start point, an end point and one or more inflection points of the operation trace.

* * * * *